(12) United States Patent
Chang et al.

(10) Patent No.: US 11,156,871 B2
(45) Date of Patent: Oct. 26, 2021

(54) BACKLIGHT MODULE

(71) Applicant: HON HAI PRECISION INDUSTRY CO., LTD., New Taipei (TW)

(72) Inventors: Wei-Chih Chang, New Taipei (TW); I-Min Lu, New Taipei (TW); Kuan-Hsien Jiang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 53 days.

(21) Appl. No.: 16/227,007

(22) Filed: Dec. 20, 2018

(65) Prior Publication Data

US 2019/0187520 A1 Jun. 20, 2019

Related U.S. Application Data

(60) Provisional application No. 62/608,503, filed on Dec. 20, 2017.

(51) Int. Cl.
*F21V 7/09* (2006.01)
*G02F 1/13357* (2006.01)
*G02F 1/1333* (2006.01)
*G02F 1/1335* (2006.01)

(52) U.S. Cl.
CPC .. *G02F 1/133611* (2013.01); *G02F 1/133308* (2013.01); *G02F 1/133603* (2013.01); *G02F 1/133605* (2013.01); *G02F 1/133606* (2013.01); *G02F 1/133609* (2013.01); *G02F 1/133314* (2021.01); *G02F 1/133614* (2021.01)

(58) Field of Classification Search
CPC ............... G02F 1/133605; G02F 1/133606
See application file for complete search history.

(56) References Cited

U.S. PATENT DOCUMENTS

| 6,199,989 B1 | 3/2001 | Maeda et al. | |
| 2009/0128914 A1 | 5/2009 | Lee et al. | |
| 2010/0002414 A1* | 1/2010 | Meir | G02B 6/0023 362/84 |
| 2010/0061096 A1 | 3/2010 | Sato | |
| 2010/0177535 A1* | 7/2010 | Sato | G02F 1/133605 362/606 |

(Continued)

FOREIGN PATENT DOCUMENTS

| CN | 101375095 A | 2/2009 |
| CN | 105301841 A | 2/2016 |

(Continued)

*Primary Examiner* — Andrew J Coughlin
(74) *Attorney, Agent, or Firm* — ScienBiziP, P.C.

(57) ABSTRACT

A backlight module for an LCD display includes backlight units. Each backlight unit includes a backplane unit, a first reflecting unit on the backplane unit, an LED on the backplane unit extending through the first reflecting unit, and a light guiding unit on a side of the LED and the first reflecting unit away from the backplane unit. The light guiding unit is transparent. Each backlight unit further includes a second reflecting unit on a side of the light guiding unit away from the backplane unit. The second reflecting unit includes at least one reflecting region and at least one transmitting region. The reflecting region reflects light; the transmitting region allows light to pass through. At least one backlight unit comprises a quantum dot layer.

7 Claims, 10 Drawing Sheets

(56) References Cited

U.S. PATENT DOCUMENTS

| | | | |
|---|---|---|---|
| 2011/0006316 A1* | 1/2011 | Ing | G02F 1/133606 |
| | | | 257/89 |
| 2011/0051044 A1 | 3/2011 | Segawa | |
| 2011/0157889 A1* | 6/2011 | Chang | G02B 5/0215 |
| | | | 362/235 |
| 2012/0327330 A1 | 12/2012 | Takahashi et al. | |
| 2016/0077381 A1* | 3/2016 | Ma | G02F 1/133605 |
| | | | 362/97.1 |
| 2016/0298828 A1 | 10/2016 | Chang et al. | |
| 2017/0160591 A1 | 6/2017 | Cho et al. | |
| 2017/0175956 A1* | 6/2017 | Chang | G02B 6/00 |

FOREIGN PATENT DOCUMENTS

| | | |
|---|---|---|
| CN | 106842692 A | 6/2017 |
| TW | 504589 | 10/2002 |
| TW | M466278 | 11/2013 |

\* cited by examiner

BACKLIGHT MODULE

FIELD

The subject matter herein generally relates to a backlight module.

BACKGROUND

A liquid crystal display device needs a backlight module to emit light. As the liquid crystal display devices become thinner, the backlight module must also be thinner and lighter. A conventional direct-type backlight module includes a back plate, a reflection sheet on the back plate, a plurality of light emitting diodes (LEDs) on the reflection sheet, a diffusion sheet, and a brightness enhancement film above the LEDs. Reducing a thickness of the backlight module is usually achieved by reducing a distance (light-mixing distance) between the back plate and the diffusion sheet. However, the density of the LEDs disposed on the back panel must be increased to ensure a uniform light-emitting effect of the backlight module. Increasing the density of the LEDs increases the energy consumption of the backlight module.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
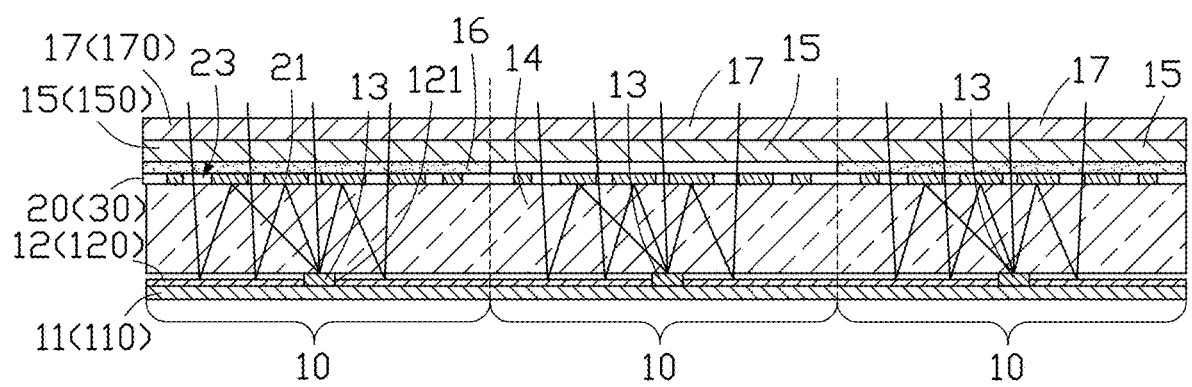
FIG. 1 is a cross-sectional view of a backlight module according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

First Embodiment

Figure 2:
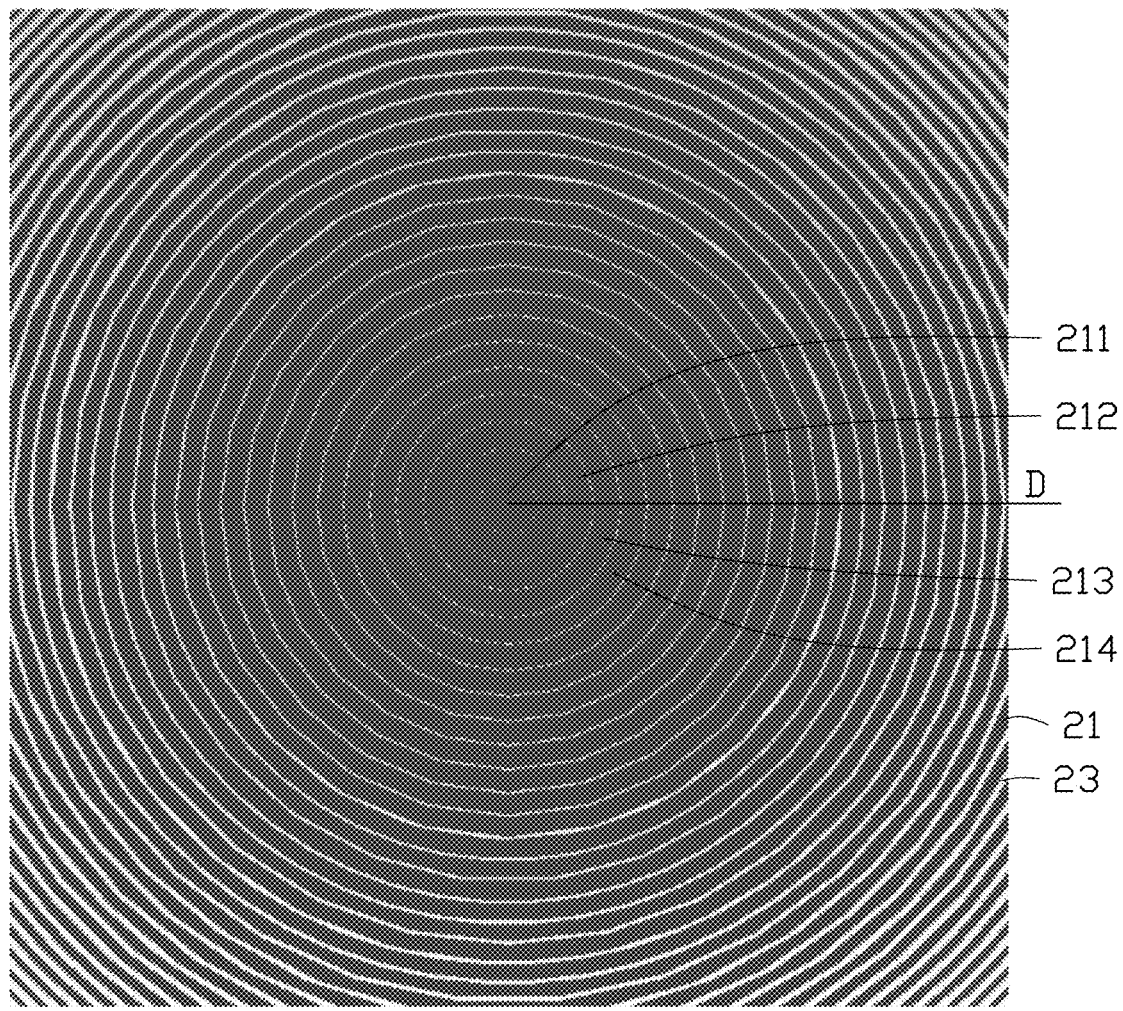
FIG. 2 is a planar view of a second reflecting unit of the backlight unit according to an embodiment of the present disclosure.

FIG. 1 illustrates a direct-type backlight module 100 of a first embodiment. The backlight module 100 includes a plurality of backlight units 10 coupled together. As shown in FIG. 1, each of the backlight units 10 includes a backplane unit 11, a first reflecting unit 12 on the backplane unit 11, an LED 13 on the backplane unit 11 and extending through the first reflecting unit 12, a light guiding unit 14 on a side of the LED 13 and the first reflecting unit 12 away from the backplane unit 11, and a second reflecting unit 20 on a side of the light guiding unit 14 away from the backplane unit 11. Each of at least one of the backlight units 10 further includes a quantum dot layer 16 on a side of the second reflecting unit 20 away from the backplane unit 11. FIG. 2 shows two backlight units 10 including the quantum dot layer 16. As shown in FIG. 1, each of the backlight units 10 has one LED 13. In the present embodiment, the LED 13 emits blue light.

The first reflecting unit 12 defines a via hole 121 extending through the first reflecting unit 12. The LED 13 is aligned with the via hole 121, thus light from the LED 13 can enter into the light guiding unit 14 through the via hole 121.

The light guiding unit 14 is located between the first reflecting unit 12 and the second reflecting unit 20, thus a certain distance between the first reflecting unit 12 and the second reflecting unit 20 can be maintained. The light guiding unit 14 is made of a transparent light guiding material.

As shown in FIG. 1, the second reflecting unit 20 includes a plurality of transmitting regions 23 and a plurality of reflecting regions 21. Light incident on the reflecting regions 21 is reflected, and light incident on the transmitting region 23 passes through the second reflecting unit 20. The reflecting regions 21 are spaced apart from each other, and the transmitting regions 23 are also spaced apart from each other. Every adjacent two of the reflecting regions 21 are spaced apart from each other by one of the transmitting regions 23, and every adjacent two of the transmitting regions 23 are spaced apart from each other by one of the reflecting regions 21.

When light is emitted from the LED 13, a part of the light directly passes through the light guiding unit 14 and the second reflecting unit 20 by the transmitting region 23. Another part of the light may be reflected multiple times before passing through the transmitting regions 23. For example, the light passing through the light guiding unit 14 incidents on the reflecting region 21 and is reflected by the reflecting region 21, and then incidents on the first reflecting unit 12 and is reflected by the first reflecting unit 12, and finally passes through the second reflecting unit 20 by the transmitting region 23.

In the embodiment, the quantum dot layer 16 receives light that passes through the transmitting region 23 of the second reflecting unit 20. The material of the quantum dots in the quantum dot layer 16 can be selected according to the desired light color of the backlight unit 10. For example, when the backlight unit 10 is required to emit red light, the quantum dot layer 16 is made of red-light quantum dot material to convert the blue light into red light. When the backlight unit 10 is required to emit green light, the quantum dot layer 16 is made of green-light quantum dot material to convert the blue light into green light. When the backlight unit 10 is required to emit blue light, the backlight unit 10 includes no quantum dot layer 16.

Referring to FIG. 2, the second reflecting unit 20 is rectangular and includes reflecting regions 21 and transmitting regions 23. The reflecting regions 21 include a first reflecting region 211 having a circular shape at center of the second reflecting unit 20, a second reflecting region 212 having a circular ring shape and surrounding the first reflecting region 211, a third reflecting region 213 having a circular ring shape and surrounding the second reflecting region 212, and a fourth reflecting region 214 having a circular ring shape and surrounding the third reflecting region 213, and so on, until there is an $n^{th}$ reflecting region 21 having a circular ring shape and surrounding an $(n-1)^{th}$ of the reflecting regions 21. There is one transmitting region 23 between every adjacent two reflecting regions 21, and every adjacent two reflecting regions 21 are spaced apart from each other by one transmitting region 23. There is one reflecting region 21 between every adjacent two transmitting regions 23, and every adjacent two transmitting regions 23 are spaced apart from each other by one reflecting region 21. The reflecting regions 21 and the transmitting regions 23 are alternately arranged in a diametric direction D. In addition, the reflecting regions 21 and the transmitting regions 23 at the edge of the second reflecting unit 20 are incomplete as circular rings, that is, are only a part of a circular ring.

As shown in FIG. 1, each of the backlight units 10 further includes other optical elements, such as a diffusing unit 15 and a brightness-enhancement unit 17. For the backlight unit 10 including the quantum dot layer 16, the diffusing unit 15 is on a side of the quantum dot layer 16 away from the LED 13 and the brightness-enhancement unit 17 is on a side of the diffusing unit 15 away from the second reflecting unit 20. For the backlight unit 10 having no quantum dot layer 16, the diffusing unit 15 is on a side of the second reflecting unit 20 away from the LED 13 and the brightness-enhancement unit 17 is on a side of the diffusing unit 15 away from the second reflecting unit 20.

In the present embodiment, as shown in FIG. 1, the backplane units 11 of the plurality of backlight units 10 are coupled together to form an integrated backplane 110. The backlight units 10 of the backlight module 100 share one backplane 110. The first reflecting units 12 of the plurality of backlight units 10 are coupled together to form an integrated first reflecting film 120. The backlight units 10 of the backlight module 100 share one first reflecting film 120. The light guiding units 14 of the plurality of backlight units 10 are coupled together to form an integrated light guiding plate 140. The backlight units 10 of the backlight module 100 share one light guiding plate 140. The second reflecting units 20 of the plurality of backlight units 10 are coupled together to form an integrated second reflecting film 30. The backlight units 10 of the backlight module 100 share one second reflecting film 30. The diffusing units 15 of the plurality of backlight units 10 are coupled together to form a diffusing film 150. The backlight units 10 of the backlight module 100 share one diffusing film 150. The brightness-enhancement units 17 of the plurality of backlight units 10 are coupled together to form an integrated brightness-enhancement film 170. The backlight units 10 of the backlight module 100 share one brightness-enhancement film 170.

Second Embodiment

Figure 3:
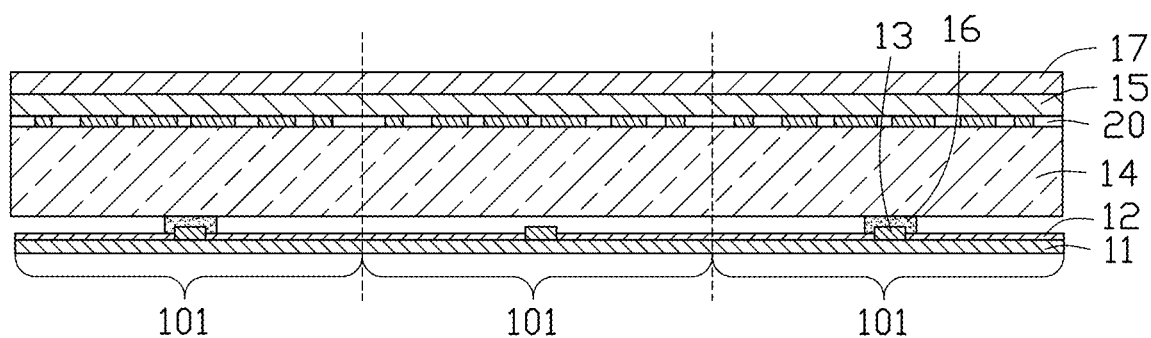
FIG. 3 is a cross-sectional view of a backlight module according to a second embodiment of the present disclosure.

FIG. 3 illustrates a direct-type backlight module 200 of a second embodiment. The backlight module 200 includes a plurality of backlight units 101 coupled together. As shown in FIG. 3, the backlight units 101 are substantially the same as the backlight unit 10 of the first embodiment and include a backplane unit 11, a first reflecting unit 12 on the backplane unit 11, an LED 13 on the backplane unit 11 and extending through the first reflecting unit 12, a light guiding unit 14 on a side of the LED 13 and the first reflecting unit 12 away from the backplane unit 11, and a second reflecting unit 20 on a side of the light guiding unit 14 away from the backplane unit 11. Each backlight unit 101 further includes a quantum dot layer 16 between the LED 13 and the light guiding unit 14. Some backlight units 101 do not have any quantum dot layer 16. As shown in FIG. 3, each backlight unit 10 has one LED 13. In the present embodiment, the LED 13 emits blue light. Thus, the light emitted from the LED 13 is directly converted into light of the desired color by the quantum dot layer 16 before entering into the light guiding unit 14.

FIG. 4A through FIG. 4D show four different second reflecting units 20 that can also be used in the backlight module 100 of first embodiment and the backlight module 200 of the second embodiment.

Figure 4A:
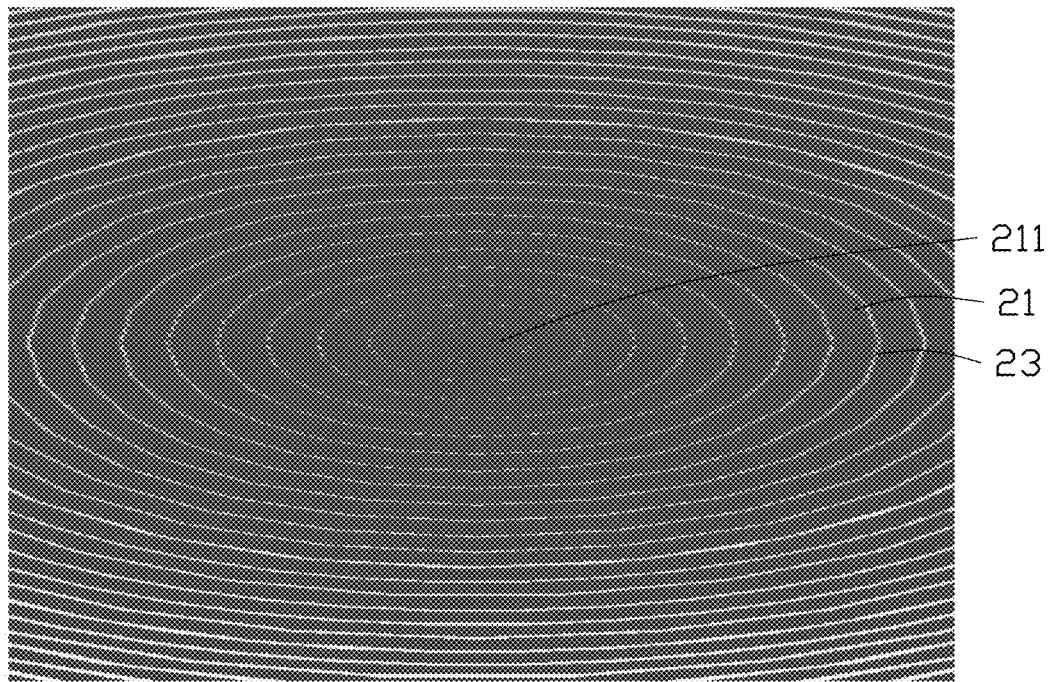
FIG. 4A through FIG. 4D are planar views showing modified embodiments of the second reflecting unit of the backlight unit.

Referring to FIG. 4A, the second reflecting unit 20 is rectangular and includes transmitting regions 23 and reflecting regions 21. The transmitting regions 23 and reflecting regions 21 are distributed in concentric ellipses. The reflecting regions 21 include a first reflecting region 211 having an elliptical shape in a center of the second reflecting unit 20, and other reflecting regions 21 each have an elliptical ring shape and surround the first reflecting region 211. One elliptical ring transmitting region 23 is between every adjacent two reflecting regions 21, and every adjacent two reflecting regions 21 are spaced apart from each other by the one elliptical ring transmitting region 23. One elliptical ring reflecting region 21 is between every adjacent two transmitting regions 23, and every adjacent two transmitting regions 23 are spaced apart from each other by the one elliptical ring reflecting region 21. In addition, the reflecting region 21 and the transmitting regions 23 at the edge of the second reflecting unit 20 are incomplete elliptical rings, that is, are only a part of an elliptical ring.

Figure 4B:
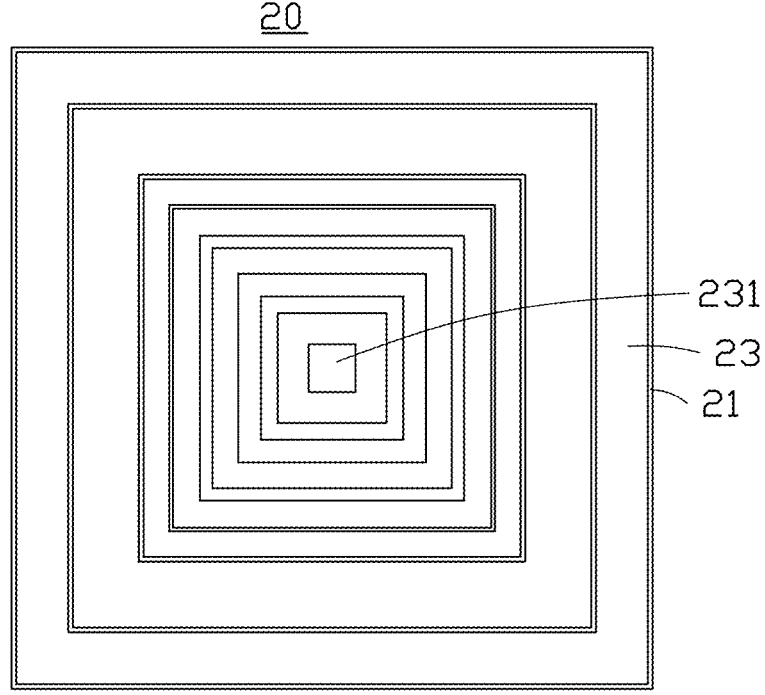

Referring to FIG. 4B, the second reflecting unit 20 is rectangular and includes transmitting regions 23 and reflecting regions 21. The transmitting regions 23 and reflecting regions 21 are distributed in concentric rectangles. The transmitting regions 23 include a first transmitting regions 231 having a rectangular shape in a center of the second reflecting unit 20, and other transmitting regions 23 each have a rectangular ring shape and surround the first transmitting regions 231. One rectangular ring reflecting region 21 is between every adjacent two transmitting regions 23, and every adjacent two transmitting regions 23 are spaced apart from each other by the one rectangular ring reflecting region 21. One rectangular ring transmitting region 23 is between every adjacent two reflecting regions 21, and every adjacent two reflecting regions 21 are spaced apart by the one rectangular ring transmitting region 23. In addition, the reflecting region 21 and the transmitting regions 23 at the edge of the second reflecting unit 20 are incomplete rectangular rings, that is, are only a part of a rectangular ring.

Figure 4C:
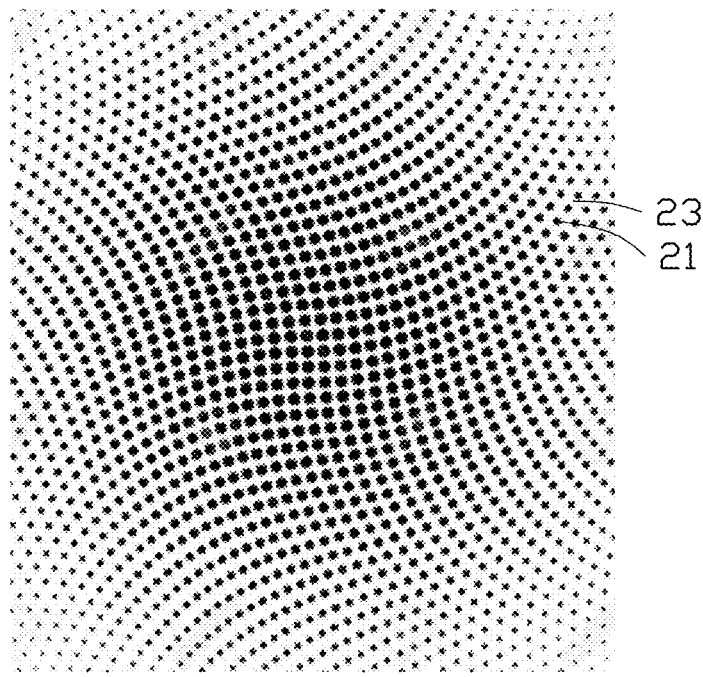

Referring to FIG. 4C, the second reflecting unit 20 is rectangular and includes a transmitting region 23 and reflecting regions 21. Each reflecting region 21 is in shape of a dot, the reflecting regions 21 are spaced apart from each other. The other regions of the second reflecting unit 20 excluding the reflecting regions 21 are the transmitting region 23. The transmitting region 23 surrounds each of the reflecting regions 21. Along a direction from a center towards an edge of the second reflecting unit 20, the sizes of the reflecting regions 21 gradually decrease, and distances between adjacent two reflecting regions 21 gradually increase.

Figure 4D:
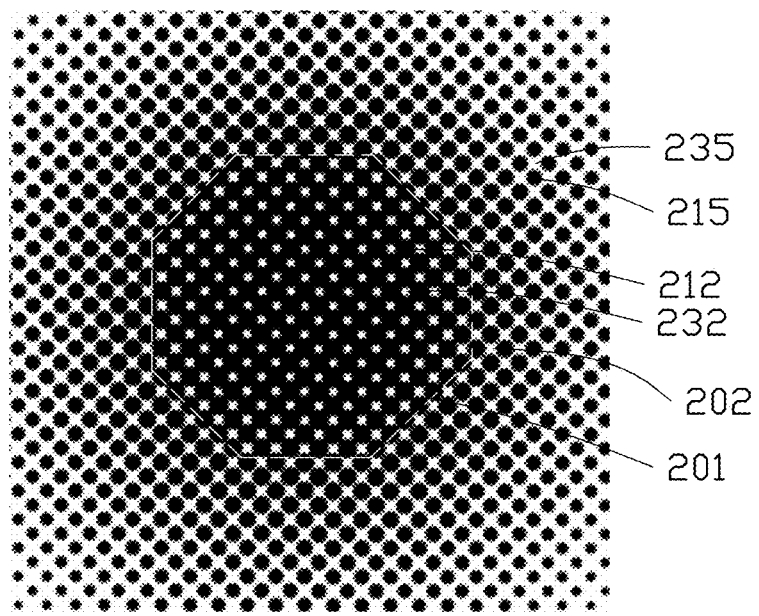

Referring to FIG. 4D, the second reflecting unit 20 is rectangular and includes a main portion 201 and a border portion 202 surrounding the main portion 201. The main portion 201 includes transmitting regions 232 spaced apart from each other and a reflecting region 21. Each transmitting region 232 is in shape of a dot. The other regions of the main portion 201 excluding the transmitting regions 232 are the reflecting region 21. Along a direction from a center towards an edge of the second reflecting unit 20, the sizes of the transmitting regions 232 of the main portion 201 gradually increase. The border portion 202 includes reflecting regions 215 spaced apart from each other and a transmitting region 235. Each reflecting region 215 is in shape of a dot. The other regions of the border portion 202 excluding the reflecting regions 215 are the transmitting region 235. Along a direction from a center towards an edge of the second reflecting unit 20, the sizes of the reflecting regions 215 of the border portion 202 gradually decrease.

It can be understood that the reflecting regions 21 and the transmitting regions 23 of the second reflecting unit 20 are not limited to the specific ones described above, and may be other various regular or irregular shapes.

Figure 5A:
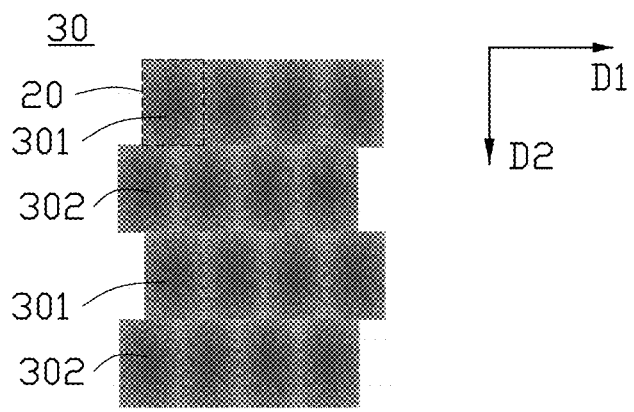
FIG. 5A through FIG. 5C are planar views illustrating three arrangements of second reflecting units of a second reflecting film of the backlight unit.

Referring to FIG. 5A, a second reflecting film 30 includes second reflecting units 20 each having a rectangular shape. The second reflecting units 20 are arranged in rows along a first direction D1. The second reflecting units 20 in each row are serially coupled together. The rows of the second reflecting units 20 are serially coupled together along the second direction D2. The odd-numbered rows 301 of the second reflecting units 20 are aligned with each other in the first direction D1, and the even-numbered rows 302 of the second reflecting units 20 are aligned with each other in the first direction D1. Each odd-numbered row 301 of the second reflecting units 20 is staggered in relation to the even-numbered rows 302 of the second reflecting units 20 in the first direction D1. Each odd-numbered row 301 of the second reflecting units 20 is staggered or offset by a certain distance from the even-numbered row 302 of the second reflecting units 20 in the first direction D1. In the present embodiment, the distance is equal to a half of a length/width of one second reflecting unit 20. As described above, the LED 13 of each backlight unit 10 aligns with a center position the second reflecting unit 20, therefore, no adjacent two rows of the LEDs 13 of the backlight units 10 are vertically aligned with each other.

Figure 5B:
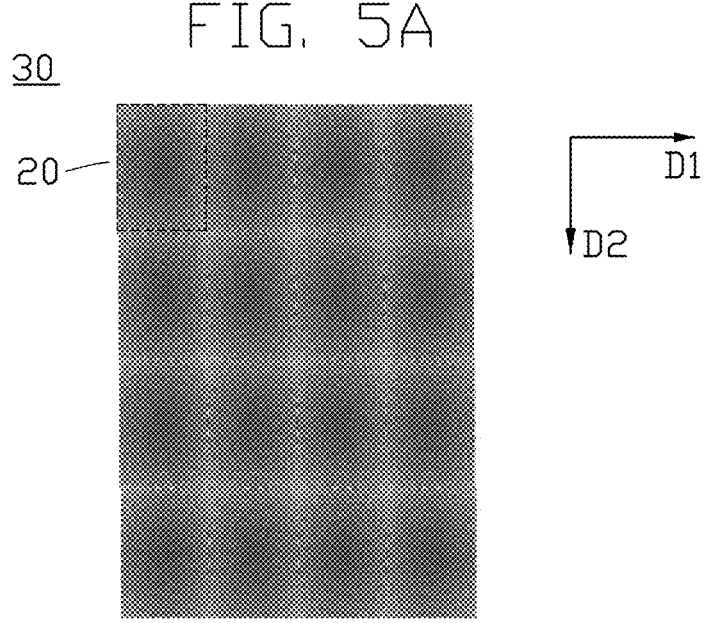

Referring to FIG. 5B, a rectangular second reflecting film 30 includes second reflecting units 20. Each second reflecting unit 20 has a rectangular shape, and the second reflecting units 20 are arranged in a matrix having rows along a first direction D1 and columns along a second direction D2. The first direction D1 is perpendicular to the second direction D2. The second reflecting units 20 in each row are serially coupled together, and the second reflecting units 20 in each column are serially coupled together. As described above, the LED 13 of each backlight unit 10 aligns with a center position of the second reflecting unit 20, therefore the LEDs 13 of the backlight units 10 are also arranged in a matrix having rows and columns.

Figure 5C:
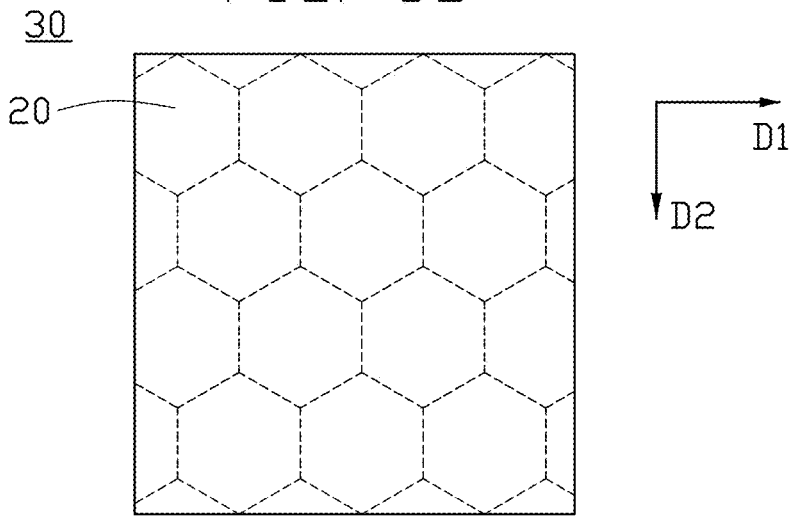

Referring to FIG. 5C, a second reflecting film 30 includes second reflecting units 20. Each second reflecting unit 20 is a regular hexagon except for the units at a border. The second reflecting units 20 are arranged in rows along a first direction D1. The second reflecting units 20 in each row are serially coupled together. The rows of the second reflecting units 20 are serially coupled together along the second direction D2. As described above, the LED 13 of each backlight unit 10 aligns with a center position of the second reflecting unit 20, therefore immediately adjacent rows of the LEDs 13 of the backlight units 10 are not aligned with each other in the second direction D2.

In the present embodiment, as shown in FIG. 1, each of the transmitting regions 23 of the second reflecting unit 20 is a through hole 23 extending through the second reflecting unit 20, and the reflecting regions 21 of the second reflecting unit 20 are made of reflective material. That is, the second reflecting unit 20 is made by defining through holes in a reflecting film (not shown).

Figure 9:
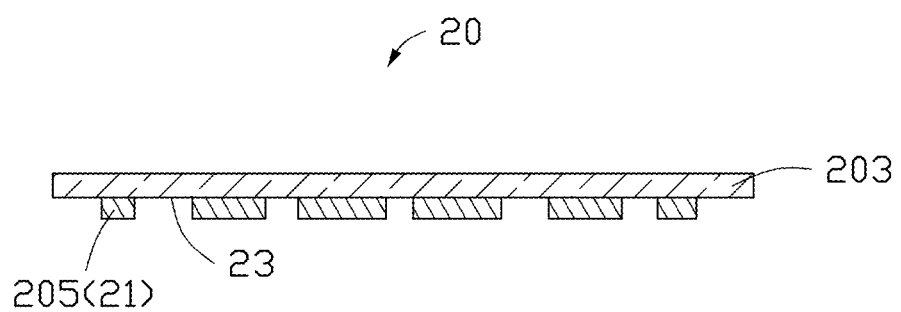
FIG. 9 is a cross-sectional view of a second reflecting unit of the backlight unit according to a modified embodiment of the present disclosure.

In other embodiments, as shown in FIG. 9, each of the second reflecting units 20 includes a transparent substrate 203 and a reflective material layer 205 formed on a surface of the transparent substrate 203 adjacent to the LED 13. The reflective material layer 205 partially covers the surface of the transparent substrate 203. The reflective material layer 205 forms the reflecting regions 21 of the second reflecting unit 20. The portion of the transparent substrate 203 that is not covered by the reflective material layer 205 forms the transmitting regions 23 of the second reflecting unit 20.

Figure 6:
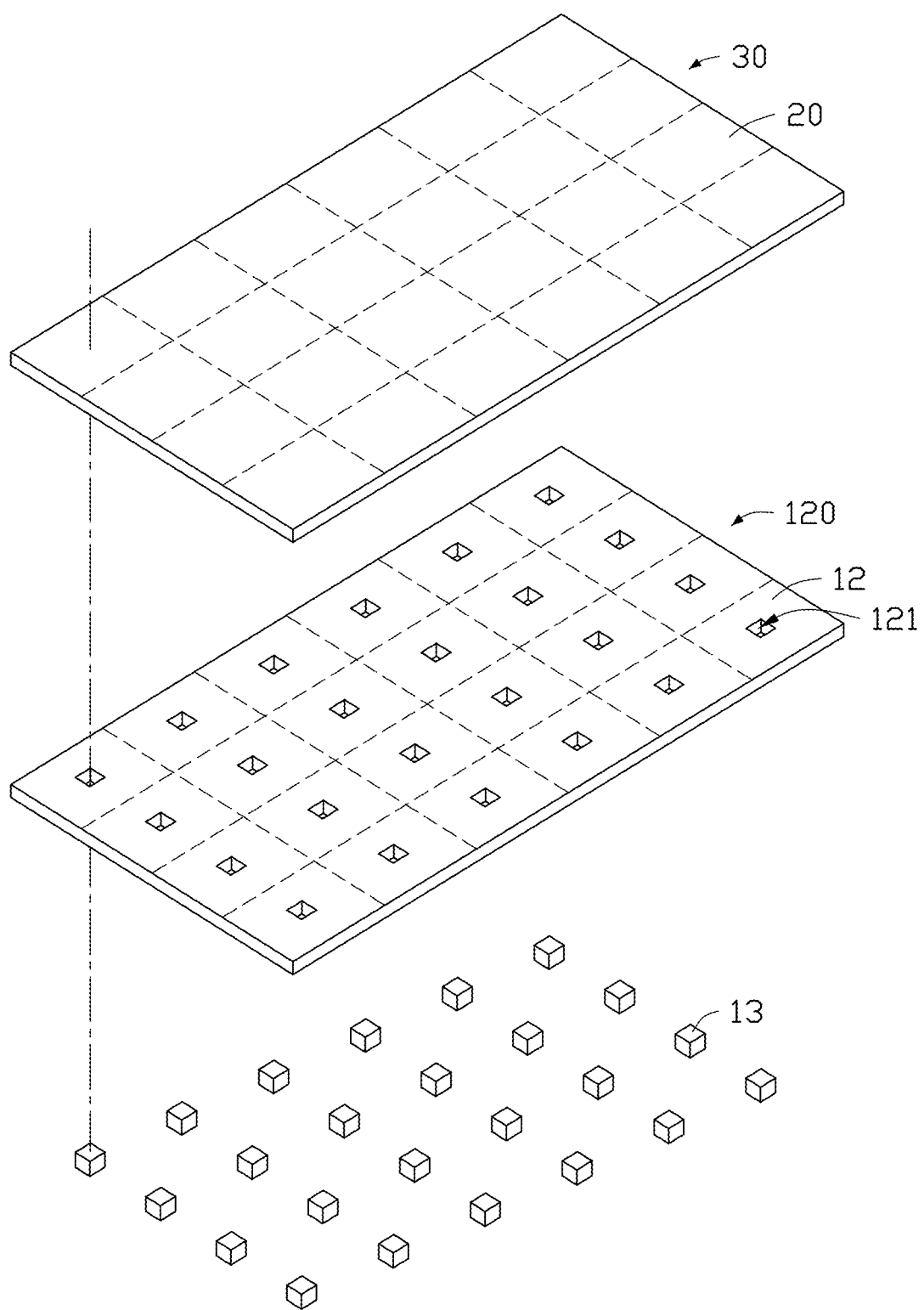
FIG. 6 is an exploded view of a first reflecting film, a second reflecting film, and LEDs of the backlight module.

Referring to FIG. 6, the first reflecting units 12 form the integrated first reflecting film 120 and the second reflecting units 20 form the integrated second reflecting film 30. The arrangement of the second reflecting units 20 is same as that shown in FIG. 5B. The first reflecting film 120 defines via holes 121 each extending through the first reflecting film 120. Each of the LEDs 13 is formed on the backplane 110 and passes through the first reflecting film 120 by one of the via holes 121.

Figure 7:
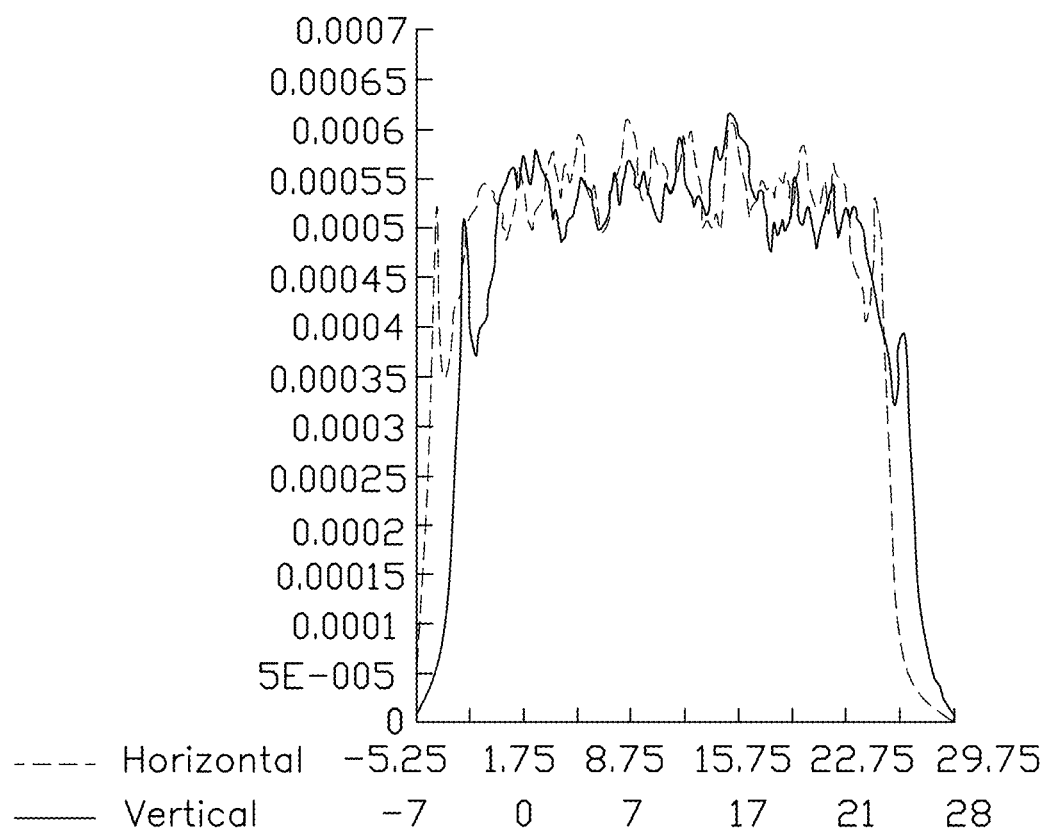
FIG. 7 is a light intensity distribution diagram of a backlight module using the second reflecting film shown in FIG. 5A.
Figure 8:
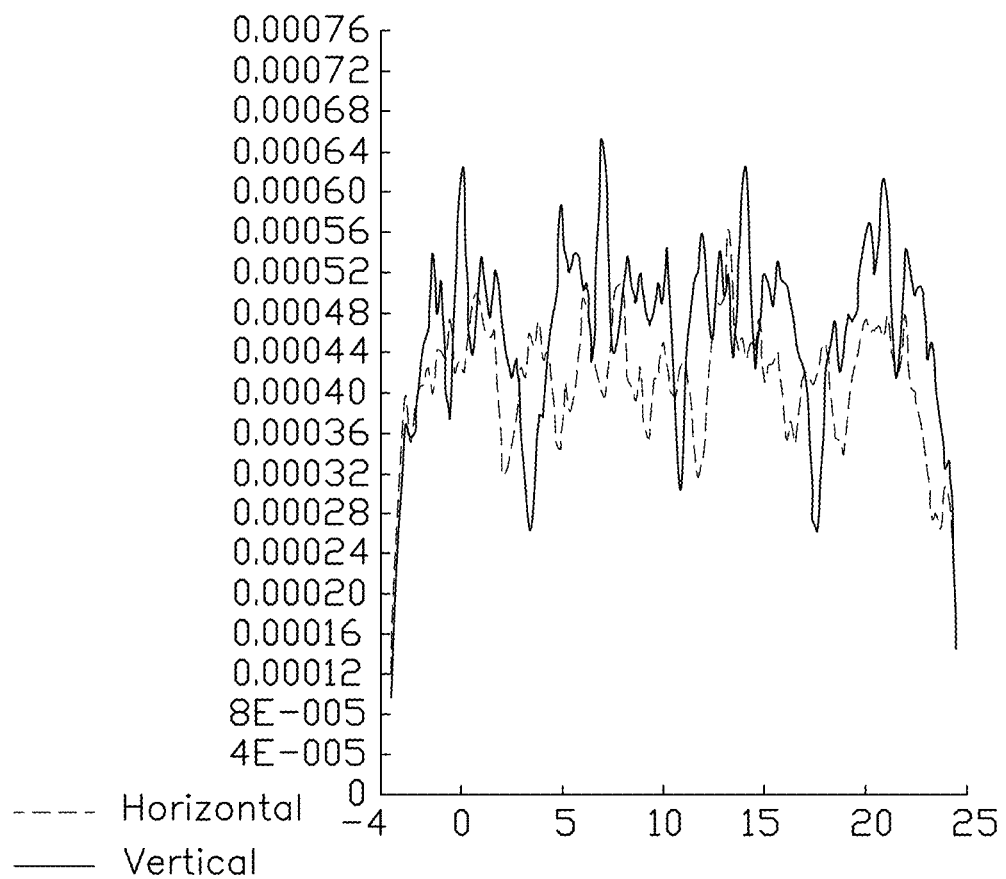
FIG. 8 is a light intensity distribution diagram of a backlight module using the second reflecting film shown in FIG. 5B.

Light intensity distribution diagrams of a backlight module are shown in FIG. 8, the backlight unit of the backlight module being connected in the manner shown in FIG. 5A. In FIG. 7, the abscissa represents position in the backlight unit 10, and coordinate 0 represents a center position of the backlight unit. The ordinate represents light intensity. As shown in FIG. 8, the backlight module has a uniform light intensity.

The same light intensity distribution diagram shows the backlight unit of the backlight module connected in the manner as shown in FIG. 5B. In FIG. 8, the abscissa represents position in the backlight unit 10, and coordinate 0 represents a center position of the backlight unit, the ordinate represents light intensity.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A backlight module, comprising:
   a plurality of backlight units, each of the plurality of backlight units comprising:
   a backplane unit;
   a first reflecting unit on the backplane unit; and
   a light emitting diode (LED) on the backplane unit and extending through the first reflecting unit;
   a light guiding unit on a side of the LED and the first reflecting unit away from the backplane unit, the light guiding unit being transparent;
   wherein each of the plurality of backlight units further comprises a second reflecting unit on a side of the light guiding unit away from the backplane unit;
   the second reflecting unit comprises at least one reflecting region and at least one transmitting region; the reflecting region is configured to reflect light; the transmitting region is configured to transmit light; and
   at least one of the plurality of backlight units comprises a quantum dot layer;
   wherein the second reflecting unit comprises a main portion and a border portion surrounding the main portion; the main portion comprises a plurality of transmitting regions spaced apart from each other and a reflecting region; a region of the main portion excluding the plurality of transmitting regions is the reflecting region; the border portion comprises a plurality of reflecting regions spaced apart from each other and a transmitting region; a region of the border portion excluding the plurality of reflecting regions is the transmitting region;
   wherein the second reflecting units of the plurality of backlight units are arranged in a plurality of rows along a first direction; the second reflecting units in each of the plurality of rows are serially coupled together; the plurality of rows of the second reflecting units are serially coupled together along a second direction; wherein the first direction is perpendicular to the second direction; odd-numbered rows of the second reflecting units are aligned with each other in the first direction, and even-numbered rows of the second reflecting units are aligned with each other in the first direction; each of the odd-numbered rows of the second reflecting units is staggered in relation to the even-numbered rows of the second reflecting units in the first direction.

2. The backlight module of claim 1, wherein sizes of the plurality of transmitting regions of the main portion gradually increase along a direction from a center towards an edge of the second reflecting unit.

3. The backlight module of claim 1, wherein sizes of the plurality of reflecting regions of the border portion gradually decrease along a direction from a center towards an edge of the second reflecting unit.

4. The backlight module of claim 1, wherein each of the odd-numbered rows of the second reflecting units offsets a distance from each of the even-numbered rows of the second reflecting units in the first direction; the distance is equal to a half of a width of the second reflecting unit.

5. The backlight module of claim 1, wherein each of the transmitting region of the second reflecting unit is a through hole extending through the second reflecting unit, and the reflecting regions of the second reflecting unit are made of reflective material.

6. The backlight module of claim 1, wherein the second reflecting unit comprises a transparent substrate and a reflective material layer on a surface of the transparent substrate adjacent to the LED; the reflective material layer partially covers the surface of the transparent substrate; the reflective material layer forms the at least one reflecting region; portions of the transparent substrate which are not covered by the reflective material layer define the at least one transmitting region.

7. The backlight module of claim 1, wherein the first reflecting unit defines a via hole, the LED extends through the first reflecting unit by the via hole.

* * * * *